US012618459B2

(12) United States Patent
Chen et al.

(10) Patent No.: US 12,618,459 B2
(45) Date of Patent: May 5, 2026

(54) INTERNAL MESHING CYLINDRICAL GEAR PAIR WITH CONSTANT MESHING CHARACTERISTICS CONSTRUCTED TOOTH PAIR

(71) Applicants: Chongqing University, Chongqing (CN); Chongqing Yisilun Technology Co., Ltd., Chongqing (CN)

(72) Inventors: Bingkui Chen, Chongqing (CN); Fei Liu, Chongqing (CN); Luhe Zhang, Chongqing (CN); Yonghong Chen, Chongqing (CN); Changyan Peng, Chongqing (CN); Wenjun Luo, Chongqing (CN); Chaoyang Li, Chongqing (CN)

(73) Assignees: Chongqing University, Chongqing (CN); Chongqing Yisilun Technology Co., Ltd., Chongqing (CN)

( * ) Notice: Subject to any disclaimer, the term of this patent is extended or adjusted under 35 U.S.C. 154(b) by 0 days.

(21) Appl. No.: 18/653,532

(22) Filed: May 2, 2024

(65) Prior Publication Data

US 2024/0401684 A1 Dec. 5, 2024

(30) Foreign Application Priority Data

May 31, 2023 (CN) .......................... 202310630490.2

(51) Int. Cl.
*F16H 55/08* (2006.01)
*F16H 1/08* (2006.01)
(Continued)

(52) U.S. Cl.
CPC .............. *F16H 55/08* (2013.01); *F16H 1/08* (2013.01); *F16H 1/10* (2013.01); *F16H 1/24* (2013.01); *F16H 2055/0893* (2013.01)

(58) Field of Classification Search
CPC ........................ F16H 55/08; F16H 2055/0893
See application file for complete search history.

(56) References Cited

U.S. PATENT DOCUMENTS 5,271,289 A * 12/1993 Baxter, Jr. .............. F16H 55/08
74/462

FOREIGN PATENT DOCUMENTS

WO WO-2006038901 A1 * 4/2006 ............. F16H 55/08

OTHER PUBLICATIONS

Weibin, Li, "Research on Basic Theory of Internal Meshing Gear Transmission with Curve Element Constructed Tooth Profiles" (includes English Abstract), Thesis Submitted to College of Mechanical Engineering of Chongqing University, Chongqing, China, May 2018.

* cited by examiner

*Primary Examiner* — Jake Cook
(74) *Attorney, Agent, or Firm* — CM Law LLP; Robert C. Klinger

(57) ABSTRACT

Provided is an internal meshing cylindrical gear pair with a constant meshing characteristics constructed tooth pair. The internal meshing cylindrical gear pair with a constructed tooth pair includes an external cylindrical gear with a constructed tooth pair and an internal cylindrical gear with a constructed tooth pair based on conjugate curves. In the present disclosure, normal tooth profile curves of the external cylindrical gear with a constructed tooth pair and the internal cylindrical gear with a constructed tooth pair are continuous combined curves with the same curve shape, which facilitates machining by the same cutter. A common normal at an inflection point or a tangent point of the continuous combined curve passes through a pitch point of the gear pair, and a position of the inflection point or the (Continued)

tangent point can be adjusted as required, so as to adjust a
sliding ratio of the gear pair.

6 Claims, 6 Drawing Sheets

(51)  Int. Cl.
       *F16H 1/10*          (2006.01)
       *F16H 1/24*          (2006.01)

INTERNAL MESHING CYLINDRICAL GEAR PAIR WITH CONSTANT MESHING CHARACTERISTICS CONSTRUCTED TOOTH PAIR

CROSS REFERENCE TO RELATED APPLICATION

This patent application claims the benefit and priority of Chinese Patent Application No. 202310630490.2, filed with the China National Intellectual Property Administration on May 31, 2023, the disclosure of which is incorporated by reference herein in its entirety as part of the present application.

TECHNICAL FIELD

The present disclosure relates to the technical field of gear transmission, and in particular, to an internal meshing cylindrical gear pair with a constant meshing characteristics constructed tooth pair, especially an internal meshing cylindrical gear pair with a constructed tooth pair that is formed by an external cylindrical gear with a constructed tooth pair and an internal cylindrical gear with a constructed tooth pair as a pair, and has the same normal tooth profile, a constant curvature radius at a meshing point that tends to infinity, a constant sliding ratio, and a constant meshing stiffness.

BACKGROUND

An internal meshing cylindrical gear pair as one of main forms of mechanical transmission functions to keep the same direction of mechanical rotation and transmit power, and decelerate to increase a torque or accelerate to reduce the torque, and is widely used in the fields of high-end equipment, aerospace, precision instruments, and the like. Most of existing internal meshing cylindrical gear pairs are involute gear pairs, which have problems such as large sliding ratio between tooth surfaces and time-varying meshing stiffness, leading to reduction of transmission efficiency, service life and dynamic meshing performance, and the like of the internal meshing cylindrical gear pairs. With the development of science and technology and the popularization in application scenarios, it is difficult for the conventional internal meshing cylindrical gear pairs to meet high performance requirements in the fields of national defense technology, industrial manufacturing, production and life, and the like.

In the paper Research on the basic theory of internal meshing gear drive with curve element constructed tooth pairs, based on the research of the basic theory of conjugate curve meshing, related application work was further performed on an internal meshing gear with a constructed tooth pair, and a basic principle of convex-concave internal meshing gear drive with curve element constructed tooth pairs was established. An internal meshing gear pair with convex teeth and concave teeth constructed in this paper need machining by means of different cutters, which increases a manufacturing cost of the gear pair. Concave and convex tooth profiles lead to a limited curvature radius at a meshing point of the gear pair, thereby limiting further improvement of the bearing capacity of the gear pair. With regard to selection of contact points, tooth surface interference occurs at pitch points, making it difficult to achieve a zero sliding ratio. Therefore, there is an urgent need for an innovative tooth profile design based on an existing design theory of gears with a constructed tooth pair having conjugate curves, so as to improve meshing performance of an internal meshing cylindrical gear pair with a constructed tooth pair and reduce production and manufacturing costs of the gear pair.

SUMMARY

An objective of the present disclosure is to provide an internal meshing cylindrical gear pair with a constant meshing characteristics constructed tooth pair, to solve the aforementioned problems existing in the prior art. The gear pair is formed by an external cylindrical gear with a constructed tooth pair and an internal cylindrical gear with a constructed tooth pair that have the same normal tooth profile, with a constant curvature radius at a meshing point that tends to infinity, a constant sliding ratio, and a constant meshing stiffness, and technically features low manufacturing cost, high bearing capacity, high transmission efficiency, low vibration noise, and the like.

To achieve the above objective, the present disclosure provides the following technical solutions.

The present disclosure provides an internal meshing cylindrical gear pair with a constant meshing characteristics constructed tooth pair, including an external cylindrical gear with a constructed tooth pair and an internal cylindrical gear with a constructed tooth pair as a pair based on conjugate curves, where a normal tooth profile curve $\Gamma_{s1}$ of the external cylindrical gear with a constructed tooth pair and a normal tooth profile curve $\Gamma_{s2}$ of the internal cylindrical gear with a constructed tooth pair are continuous combined curves $\Gamma_L$ with the same curve shape, and the continuous combined curves $\Gamma_L$ include a combined curve $\Gamma_{L1}$ of an odd power function curve and a tangent at an inflection point thereof, a combined curve $\Gamma_{L2}$ of a sine function curve and a tangent at an inflection point thereof, a combined curve $\Gamma_{L3}$ of an epicycloid function curve and a tangent at an inflection point thereof, a combined curve $\Gamma_{L4}$ of an odd power function, a combined curve $\Gamma_{L5}$ is of a sine function, or a combined curve $\Gamma_{L6}$ of an epicycloid function; the continuous combined curve is formed by two continuous curves, a connection point of the two continuous curves is an inflection point or a tangent point of the continuous combined curve, and the inflection point or the tangent point of the continuous combined curve is a designated point located on a meshing force action line of the internal meshing cylindrical gear pair with a constructed tooth pair; and the normal tooth profile curves are swept along given conjugate curves to obtain tooth surfaces of the external cylindrical gear with a constructed tooth pair and the internal cylindrical gear with a constructed tooth pair.

Preferably, when the continuous combined curve $\Gamma_L$ is the combined curve $\Gamma_{L1}$ of the odd power function curve and the tangent at the inflection point thereof, the continuous combined curve $\Gamma_L$ is formed by an odd power function curve $\Gamma_{L12}$ and a tangent $\Gamma_{L11}$ at an inflection point of the odd power function curve; a rectangular coordinate system is established at the tangent point of the continuous combined curve, and an equation of the combined curve $\Gamma_{L1}$ of the odd power function curve and the tangent at the inflection point thereof is as follows:

$$\begin{cases} \Gamma_{L11}\!:\!x_{10} = t,\, y_{10} = 0 \ (t_1 \le t < 0) \\ \Gamma_{L12}\!:\!x_{10} = t,\, y_{10} = at^{2n-1} \ (0 \le t \le t_2) \end{cases},$$

where a parameter $t$ is an independent variable of the equation; $t_1$ and $t_2$ are value ranges of the continuous curve;

a is a coefficient of the equation; n is a degree of the independent variable and is a positive integer; and $x_{10}$ and $y_{10}$ are x-axis and y-axis coordinate values of the combined curve in the rectangular coordinate system, respectively.

Preferably, when the continuous combined curve $\Gamma_L$ is the combined curve $\Gamma_{L2}$ of the sine function curve and the tangent at the inflection point thereof, the continuous combined curve $\Gamma_L$ is formed by a sine function curve $\Gamma_{L22}$ and a tangent $\Gamma_{L21}$ at an inflection point of the sine function curve; a rectangular coordinate system is established at the tangent point of the continuous combined curve, and an equation of the combined curve $\Gamma_{L2}$ of the sine function curve and the tangent at the inflection point thereof is as follows:

$$\begin{cases} \Gamma_{L21}:x_{20} = t,\ y_{20} = kt\ (t_1 \le t < 0) \\ \Gamma_{L22}:x_{20} = t,\ y_{20} = a\sin(bt)\ (0 \le t \le t_2) \end{cases},$$

where a parameter t is an independent variable of the equation; $t_1$ and $t_2$ are value ranges of the continuous curve; a and b are coefficients of the equation; $x_{20}$ and $y_{20}$ are x-axis and y-axis coordinate values of the combined curve in the rectangular coordinate system, respectively; and k is a slope of the tangent at the inflection point of the sine function curve.

Preferably, when the continuous combined curve $\Gamma_L$ is the combined curve $\Gamma_{L3}$ of the epicycloid function curve and the tangent at the inflection point thereof, the continuous combined curve $\Gamma_L$ is formed by an epicycloid function curve $\Gamma_{L32}$ and a tangent $\Gamma_{L31}$ at an inflection point of the epicycloid function curve; a rectangular coordinate system is established at the tangent point of the continuous combined curve, and an equation of the combined curve $\Gamma_{L3}$ of the epicycloid function curve and the tangent at the inflection point thereof is as follows:

$$\begin{cases} \Gamma_{L31}: \\ \quad x_{30} = t \\ \quad y_{30} = kt\ (t_1 \le t < 0) \\ \Gamma_{L32}: \\ \quad x_{30} = (R + r)\sin t - e\sin((R + r)t/r) \quad (0 \le t \le t_2) \\ \quad y_{30} = (R + r)\cos t - e\cos((R + r)t/r) - (R + r + e) \end{cases},$$

where a parameter t is an independent variable of the equation; $t_1$ and $t_2$ are value ranges of the continuous curve; a and b are coefficients of the equation; R and r are radii of a cycloidal moving circle and fixed circle, respectively; e is an eccentric distance; $x_{30}$ and $y_{30}$ are x-axis and y-axis coordinate values of the combined curve in the rectangular coordinate system, respectively; and k is a slope of the tangent at the inflection point of the epicycloid function curve.

Preferably, when the continuous combined curve $\Gamma_L$ is the combined curve $\Gamma_{L4}$ of the odd power function, the continuous combined curve $\Gamma_L$ is formed by a first odd power function curve $\Gamma_{L41}$ and a second odd power function curve $\Gamma_{L42}$; a rectangular coordinate system is established at the inflection point of the continuous combined curve, and an equation of the combined curve $\Gamma_{L4}$ of the odd power function is as follows:

$$\begin{cases} \Gamma_{L41}:x_{40} = t,\ y_{40} = at^{2n1-1} \quad (t_1 \le\ < 0) \\ \Gamma_{L42}:x_{40} = t,\ y_{40} = bt^{2n2-1} \quad (0 \le t \le t_2) \end{cases},$$

where a parameter t is an independent variable of the equation; $t_1$ and $t_2$ are value ranges of the continuous curve; a and b are coefficients of the equation; n1 and n2 are degrees of the independent variable and are positive integers; and $x_{40}$ and $y_{40}$ are x-axis and y-axis coordinate values of the combined curve in the rectangular coordinate system, respectively.

Preferably, when the continuous combined curve $\Gamma_L$ is the combined curve $\Gamma_{L5}$ of the sine function, the continuous combined curve $\Gamma_L$ is formed by a first sine function curve $\Gamma_{L51}$ and a second sine function curve $\Gamma_{L52}$; a rectangular coordinate system is established at the inflection point of the continuous combined curve, and an equation of the combined curve $\Gamma_{L5}$ of the sine function is as follows:

$$\begin{cases} \Gamma_{L51}:x_{50} = t,\ y_{50} = a_1\sin(b_1 t) \quad (t_1 \le t < 0) \\ \Gamma_{L52}:x_{50} = t,\ y_{50} = a_2\sin(b_2 t) \quad (0 \le t \le t_2) \end{cases},$$

where a parameter t is an independent variable of the equation; $t_1$ and $t_2$ are value ranges of the continuous curve; $a_1$, $b_1$, $a_2$ and $b_2$ are coefficients of the equation; and $x_{50}$ and $y_{50}$ are x-axis and y-axis coordinate values of the combined curve in the rectangular coordinate system, respectively.

Preferably, when the continuous combined curve $\Gamma_L$ is the combined curve $\Gamma_{L6}$ of the epicycloid function, the continuous combined curve $\Gamma_L$ is formed by a first epicycloid function curve $\Gamma_{L61}$ and a second epicycloid function curve $\Gamma_{L62}$; a rectangular coordinate system is established at the inflection point of the continuous combined curve, and an equation of the combined curve $\Gamma_{L6}$ of the epicycloid function is as follows:

$$\begin{cases} \Gamma_{L61}: \\ \quad x_{60} = -(R_1 + r_1)\sin t + e\sin((R_1 + r_1)t/r_1) \quad (t_1 \le t < 0) \\ \quad y_{60} = -(R_1 + r_1)\cos t + e\cos((R_1 + r_1)t/r_1) - (R_1 + r_1 - e) \\ \Gamma_{L62}: \\ \quad x_{60} = (R_2 + r_2)\sin t - e\sin((R_2 + r_2)t/r_2) \quad (0 \le t \le t_2) \\ \quad y_{60} = (R_2 + r_2)\cos t - e\cos((R_2 + r_2)t/r_2) - (R_2 + r_2 + e) \end{cases},$$

where a parameter t is an independent variable of the equation; $t_1$ and $t_2$ are value ranges of the continuous curve; $R_1$ and $r_1$ are radii of a first epicycloid moving circle and fixed circle, respectively, and $R_2$ and $r_2$ are radii of a second epicycloid moving circle and fixed circle, respectively; e is an eccentric distance; and $x_{60}$ and $y_{60}$ are x-axis and y-axis coordinate values of the combined curve in the rectangular coordinate system, respectively.

Preferably, a curve equation of the normal tooth profile curve $\Gamma_{s1}$ of the external cylindrical gear with a constructed tooth pair obtained by rotating the continuous combined curve $\Gamma_L$ around an origin of the rectangular coordinate system by an angle $\alpha_1$ is as follows:

$$\begin{cases} x_{01} = x_{n0}\cos\alpha_1 - y_{n0}\sin\alpha_1 \\ y_{01} = x_{n0}\sin\alpha_1 + y_{n0}\cos\alpha_1 \end{cases} (n = 1, 2, 3, 4, 5, 6),$$

where $x_{01}$ and $y_{01}$ are x-axis and y-axis coordinate values of the normal tooth profile curve of the external cylindrical gear with a constructed tooth pair in the rectangular coordinate system, respectively.

Preferably, a curve equation of the normal tooth profile curve $\Gamma_{s2}$ of the internal cylindrical gear with a constructed tooth pair obtained by rotating the normal tooth profile curve $\Gamma_{s1}$ of the external cylindrical gear with a constructed tooth pair around the origin of the rectangular coordinate system by an angle of 180° is as follows:

$$\begin{cases} x_{02} = x_{01}\cos(180°) - y_{01}\sin(180°) \\ y_{02} = x_{01}\sin(180°) + y_{01}\cos(180°) \end{cases},$$

where $x_{02}$ and $y_{02}$ are x-axis and y-axis coordinate values of the normal tooth profile curve of the internal cylindrical gear with a constructed tooth pair in the rectangular coordinate system, respectively.

Preferably, a tooth surface $\Sigma_1$ of the external cylindrical gear with a constructed tooth pair is obtained by sweeping the normal tooth profile curve $\Gamma_{s1}$ of the external cylindrical gear with a constructed tooth pair along a given helix, with a tooth surface equation as follows:

$$\begin{cases} x_{\Sigma 1} = x_{01}\cos\varphi_1 - y_{01}\cos\beta\sin\varphi_1 + r_{01}\cos\varphi_1 \\ y_{\Sigma 1} = x_{01}\sin\varphi_1 + y_{01}\cos\beta\cos\varphi_1 + r_{01}\sin\varphi_1 \\ z_{\Sigma 1} = r_{01}\varphi_1\cot\beta - y_{01}\sin\beta \end{cases},$$

where $x_{\Sigma 1}$, $y_{\Sigma 1}$ and $z_{\Sigma 1}$ are coordinate values of the tooth surface of the external cylindrical gear with a constructed tooth pair, respectively; $\beta$ is a helix angle of the gear pair; $\varphi_1$ is an angle of a given contact line; and $r_{01}$ is a pitch radius of the external cylindrical gear with a constructed tooth pair.

Preferably, a tooth surface $\Sigma_2$ of the internal cylindrical gear with a constructed tooth pair is obtained by sweeping the normal tooth profile curve $\Gamma_{s2}$ of the internal cylindrical gear with a constructed tooth pair along a given helix, with a tooth surface equation as follows:

$$\begin{cases} x_{\Sigma 2} = x_{02}\cos\varphi_1 - x_{02}\cos\beta\sin\varphi_1 + r_{02}\cos\varphi_1 \\ y_{\Sigma 2} = x_{02}\sin\varphi_1 + y_{02}\cos\beta\cos\varphi_1 + r_{02}\sin\varphi_1 \\ z_{\Sigma 2} = r_{02}\varphi_1\cot\beta - y_{02}\sin\beta \end{cases},$$

where $x_{\Sigma 2}$, $y_{\Sigma 2}$ and $z_{\Sigma 2}$ are coordinate values of the tooth surface of the internal cylindrical gear with a constructed tooth pair, respectively, and $r_{02}$ is a pitch radius of the internal cylindrical gear with a constructed tooth pair.

Preferably, a contact ratio of the internal meshing cylindrical gear pair with a constructed tooth pair is designed as an integer to achieve transmission at a constant meshing stiffness.

Compared with the prior art, the present disclosure has the following technical effects:

In the present disclosure, an internal cylindrical gear with a constructed tooth pair and an external cylindrical gear with a constructed tooth pair have the same normal tooth profile, which can be machined by using the same cutter, thus reducing a manufacturing cost. A curvature radius at a meshing point is constant and tends to infinity, which improves the bearing capacity of the gear pair. A sliding ratio during meshing is constant and may be designed as a zero sliding ratio, which improves transmission efficiency of the gear pair and reduces wear during transmission. A contact ratio of the internal meshing cylindrical gear pair with a constructed tooth pair is designed as an integer, which can achieve a constant meshing stiffness, thus greatly reducing vibration noise of the gear pair.

BRIEF DESCRIPTION OF THE DRAWINGS

To describe the technical solutions in embodiments of the present disclosure or in the prior art more clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

In the figures: 1—External cylindrical gear with a constructed tooth pair, 2—Internal cylindrical gear with a constructed tooth pair.

DETAILED DESCRIPTION OF THE EMBODIMENTS

The technical solutions of the embodiments of the present disclosure are clearly and completely described below with reference to accompanying drawings in the embodiments of the present disclosure. Apparently, the described embodiments are merely some rather than all of the embodiments of the present disclosure. All other embodiments obtained by those of ordinary skill in the art based on the embodiments of the present disclosure without creative efforts shall fall within the protection scope of the present disclosure.

In order to make the above objective, features and advantages of the present disclosure clearer and more comprehensible, the present disclosure will be further described in detail below in combination with accompanying drawings and specific implementations.

As shown in FIGS. 1 to 7, in an internal meshing cylindrical gear pair with a constant meshing characteristics constructed tooth pair disclosed in the present disclosure, a normal tooth profile curve of an external cylindrical gear 1 with a constructed tooth pair and a normal tooth profile curve of an internal cylindrical gear 2 with a constructed tooth pair are continuous combined curves with the same curve shape, and a meshing point of the external cylindrical gear 1 with a constructed tooth pair and the internal cylindrical gear 2 with a constructed tooth pair is at an inflection point or a tangent point of the continuous combined curve.

In the embodiment of the present disclosure, basic parameters of the internal meshing cylindrical gear pair with a constant meshing characteristics constructed tooth pair are as follows: Normal module m=8, number of teeth of the external cylindrical gear 1 with a constructed tooth pair: $z_1$=20, number of teeth of the internal cylindrical gear 2 with a constructed tooth pair: $z_2$=82, addendum coefficient $h_a^*$=0.5, dedendum coefficient $h_f^*$=0.5, tip clearance coefficient c*=0.2, addendum $h_a$=4 mm, dedendum $h_f$=5.6 mm, helix angle β=15°, and tooth width w=40 mm.

Figure 1:
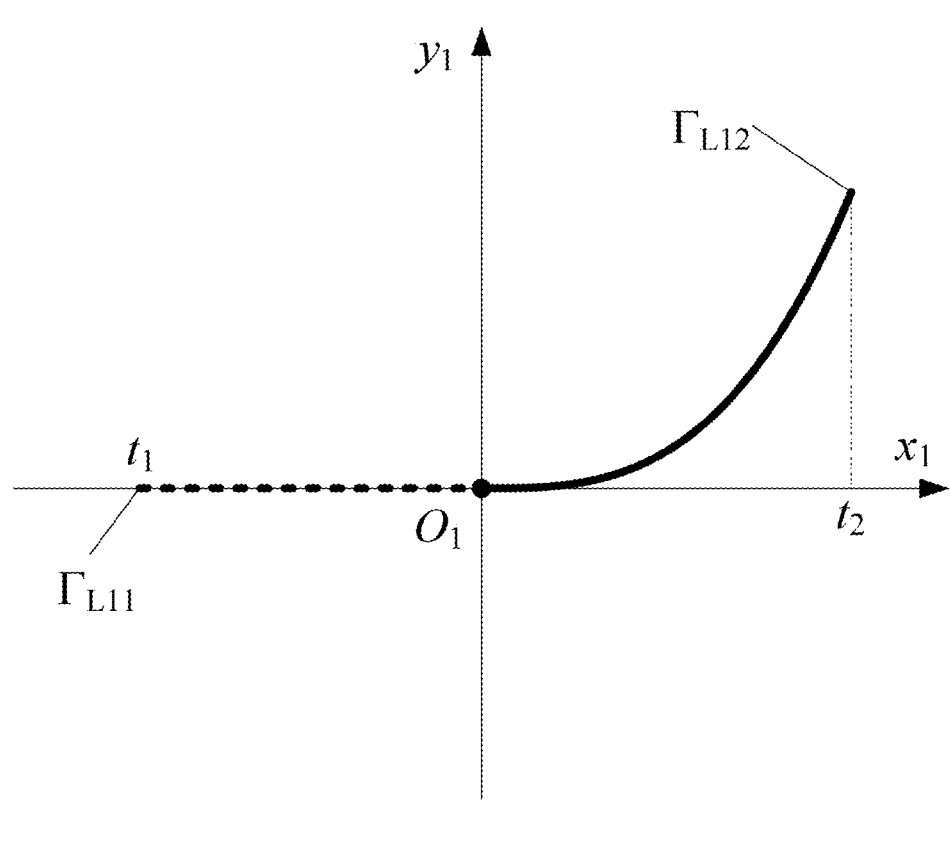
FIG. 1 is a schematic diagram of a combined curve of an odd power function curve and a tangent at an inflection point thereof according to an embodiment of the present disclosure.

With a combined curve of an odd power function curve and a tangent at an inflection point thereof as an example, the combined curve of the odd power function curve and the tangent at the inflection point thereof was drawn in a rectangular coordinate system $\sigma_1$ ($O_1$–$x_1$, $y_1$), as shown in FIG. 1. Taking a coefficient a=1.2 and n=2, an equation of the combined curve $\Gamma_{L1}$ (formed by an odd power function curve $\Gamma_{L12}$ and a tangent $\Gamma_{L11}$ at an inflection point of the odd power function curve) of an odd power function curve and a tangent at an inflection point thereof is as follows:

$$\begin{cases} \Gamma_{L11}{:}x_{10} = t,\, y_{10} = 0 \ (t_1 \le t < 0) \\ \Gamma_{L21}{:}x_{10} = t,\, y_{10} = 1.2t^3 \ (0 \le t \le t_2) \end{cases},$$

where $x_{10}$ and $y_{10}$ are x-axis and y-axis coordinate values of the combined curve in the rectangular coordinate system $\sigma_1$, respectively; a parameter/is an independent variable of the equation; and $t_1$ and $t_2$ are value ranges of the continuous curve.

Figure 2:
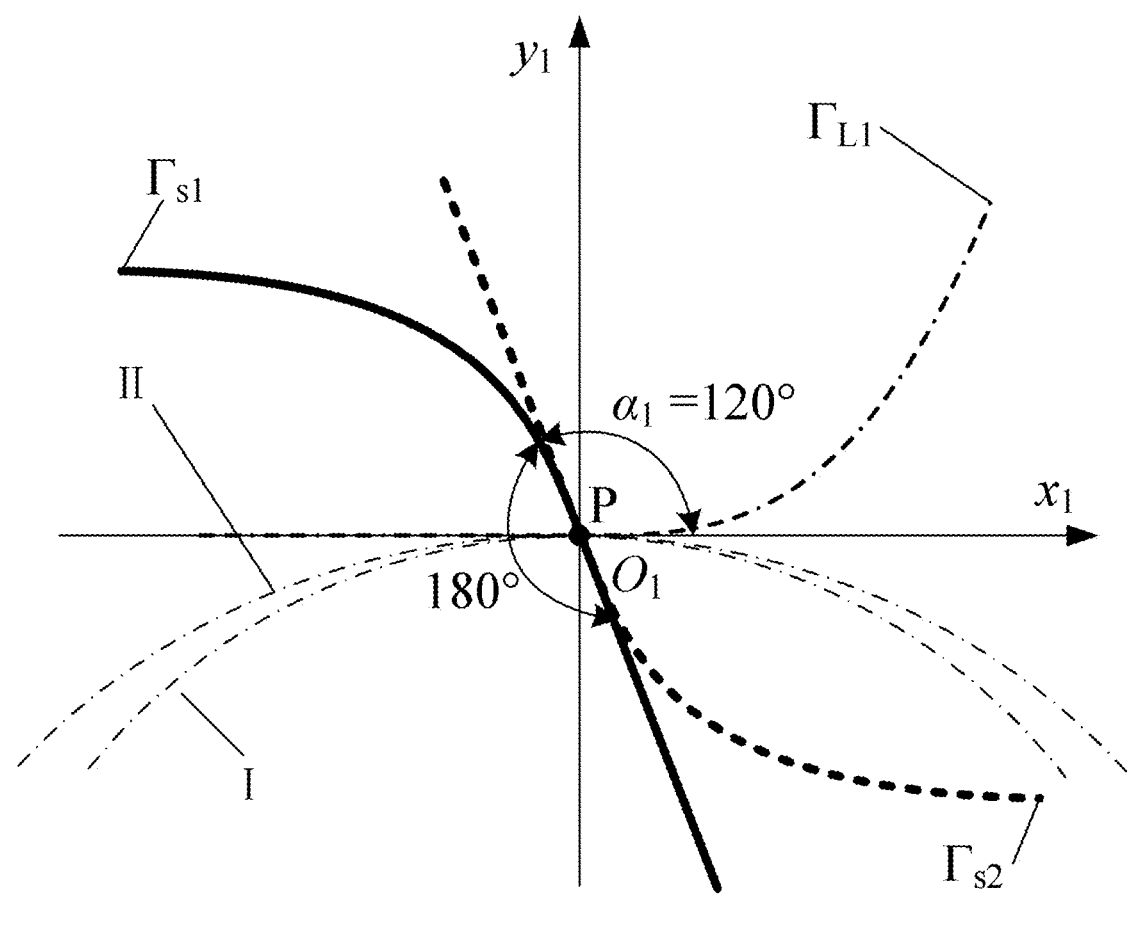
FIG. 2 is a schematic diagram illustrating formation of a normal tooth profile of an internal meshing cylindrical gear pair with a constructed tooth pair having a combined curve of an odd power function curve and a tangent at an inflection point thereof as a tooth profile curve according to an embodiment of the present disclosure.

A schematic diagram illustrating formation of a normal tooth profile of a gear pair with a constructed tooth pair having a combined curve of an odd power function curve and a tangent at an inflection point thereof as a tooth profile curve according to an embodiment of the present disclosure is shown in FIG. 2. An inflection point P is a meshing point, I is a pitch circle of an external cylindrical gear with a constructed tooth pair, and II is a pitch circle of an internal cylindrical gear with a constructed tooth pair. In the figure, a tooth root of the external cylindrical gear 1 with a constructed tooth pair and a tooth root of the internal cylindrical gear 2 with a constructed tooth pair are tangent segments, and a tooth tip of the external cylindrical gear 1 with a constructed tooth pair and a tooth tip of the internal cylindrical gear 2 with a constructed tooth pair are cubic power function curve segments. When the continuous combined curve $\Gamma_L$ rotates around an origin of the rectangular coordinate system by an angle $\alpha_1$ to obtain a normal tooth profile curve $\Gamma_{s1}$ of the cylindrical gear with a constructed tooth pair, the value of the rotation angle $\alpha_1$ needs to be determined according to specific parameters of the gear pair, with a general value range as follows: 0°<$\alpha_1$<180°. A specific formation process and a tooth profile curve equation of the normal tooth profile of the internal meshing cylindrical gear pair with a constructed tooth pair are as follows:

The combined curve $\Gamma_{L1}$ of the odd power function curve and the tangent at the inflection point thereof rotates around the rectangular coordinate system $\sigma_1$ by an angle of $\alpha_1$=120° to obtain the normal tooth profile curve $\Gamma_{s1}$ of the external cylindrical gear 1 with a constructed tooth pair, with a curve equation as follows:

$$\begin{cases} x_{01} = -0.5x_{10} - 0.866y_{10} \\ y_{01} = 0.866x_{10} - 0.5y_{10} \end{cases},$$

where $x_{01}$ and you are x-axis and y-axis coordinate values of the normal tooth profile curve $\Gamma_{s1}$ of the external cylindrical gear 1 with a constructed tooth pair in the rectangular coordinate system $\sigma_1$, respectively.

A normal tooth profile curve $\Gamma_{s2}$ of the internal cylindrical gear 2 with a constructed tooth pair is obtained by rotating the normal tooth profile curve $\Gamma_{s1}$ of the external cylindrical gear 1 with a constructed tooth pair around the rectangular coordinate system $\sigma_1$ by an angle of 180°, with a curve equation as follows:

$$\begin{cases} x_{02} = -x_{01} \\ y_{02} = -y_{01} \end{cases},$$

where $x_{02}$ and $y_{02}$ are x-axis and y-axis coordinate values of the normal tooth profile curve $\Gamma_{s2}$ of the internal cylindrical gear 2 with a constructed tooth pair in the rectangular coordinate system $\sigma_1$, respectively.

Figure 3:
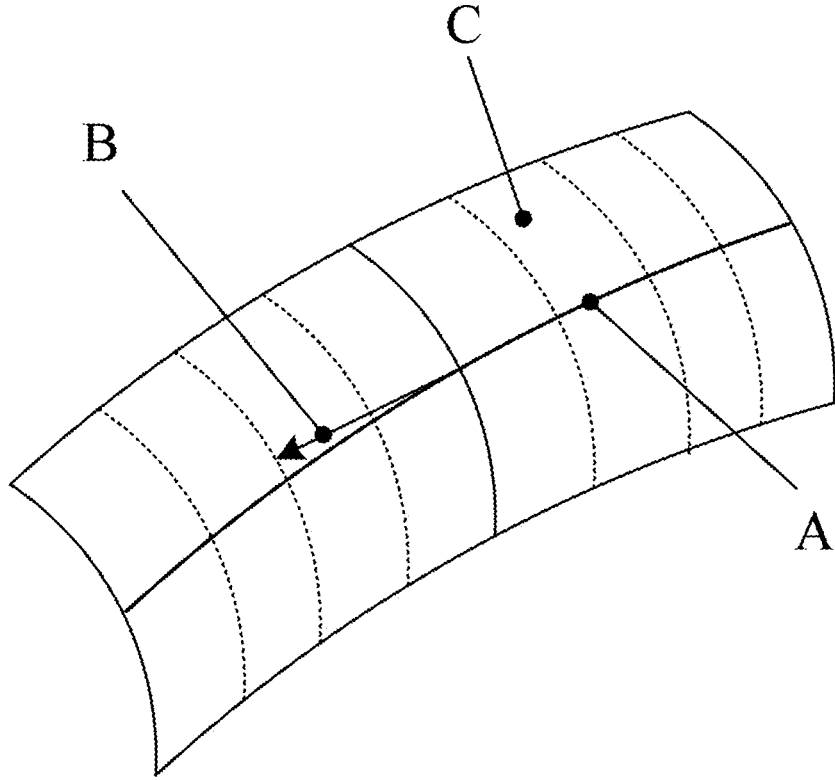
FIG. 3 is a schematic diagram illustrating construction of a tooth surface of an internal meshing cylindrical gear pair with a constructed tooth pair having a combined curve of an odd power function curve and a tangent at an inflection point thereof as a tooth profile curve according to an embodiment of the present disclosure.

FIG. 3 is a schematic diagram illustrating construction of a tooth surface of an internal meshing cylindrical gear pair with a constructed tooth pair with a combined curve of an odd power function curve and a tangent at an inflection point thereof as a tooth profile curve according to an embodiment of the present disclosure. In the figure, A represents conjugate curves, B represents a tooth profile sweeping direction, and C represents a tooth surface obtaining by sweeping of a normal tooth profile curve family. A specific construction process and a tooth surface equation of the tooth surface of the internal meshing cylindrical gear pair with a constructed tooth pair are as follows:

A tooth surface $\Sigma_1$ of the external cylindrical gear 1 with a constructed tooth pair is obtained by sweeping the normal tooth profile curve $\Gamma_{s1}$ of the external cylindrical gear 1 with a constructed tooth pair along a given helix, with an equation of $\Sigma_1$ as follows:

$$\begin{cases} x_{\Sigma1} = (x_{01} + 82.82)\cos\varphi_1 - 0.966x_{01}\sin\varphi_1 \\ y_{\Sigma1} = (x_{01} + 82.82)\sin\varphi_1 + 0.966y_{01}\cos\varphi_1 \\ z_{\Sigma1} = 309.09\varphi_1 - 0.259y_{01} \end{cases},$$

where $x_{\Sigma1}$, $y_{\Sigma1}$ and $z_{\Sigma1}$ are coordinate values of the tooth surface of the external cylindrical gear 1 with a constructed tooth pair; and $\varphi_1$ is an angle of a given contact line.

Similarly, a tooth surface $\Sigma_2$ of the internal cylindrical gear 2 with a constructed tooth pair is obtained by sweeping the normal tooth profile curve $\Gamma_{s2}$ of the internal cylindrical gear 2 with a constructed tooth pair along a given helix, with a tooth surface equation as follows:

$$\begin{cases} x_{\Sigma2} = (x_{02} + 339.57)\cos\varphi_1 - 0.966x_{02}\sin\varphi_1 \\ y_{\Sigma2} = (x_{01} + 339.57)\sin\varphi_1 + 0.966y_{02}\cos\varphi_1 \;, \\ z_{\Sigma2} = 1267.29\varphi_1 - 0.259y_{02} \end{cases}$$

where $x_{\Sigma2}$, $y_{\Sigma2}$ and $z_{\Sigma2}$ are coordinate values of the tooth surface of the internal cylindrical gear 2 with a constructed tooth pair.

Figure 4:
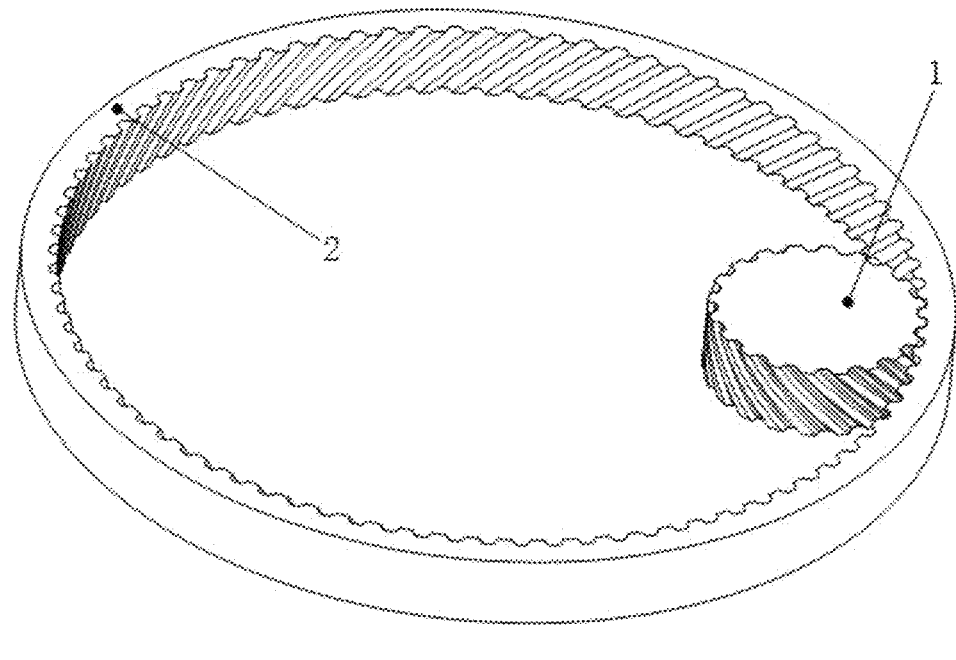
FIG. 4 is a schematic entity diagram of an internal meshing cylindrical gear pair with a constructed tooth pair having a combined curve of an odd power function curve and a tangent at an inflection point thereof as a tooth profile curve according to an embodiment of the present disclosure.

FIG. 4 is a schematic entity diagram of an internal meshing cylindrical gear pair with a constructed tooth pair having a combined curve of an odd power function curve and a tangent at an inflection point thereof as a tooth profile curve according to an embodiment of the present disclosure. An addendum circle and a dedendum circle are generated by stretching. Trimming, stitching, rounding, and other operations are performed on the tooth surfaces of the external cylindrical gear 1 with a constructed tooth pair and the internal cylindrical gear 2 with a constructed tooth pair to obtain an entity model of the internal meshing cylindrical gear pair with a constant meshing characteristics constructed tooth pair.

In the embodiment of the present disclosure, the normal tooth profile curves of the external cylindrical gear 1 with a constructed tooth pair and the internal cylindrical gear 2 with a constructed tooth pair each may alternatively be a combined curve $\Gamma_{L2}$ of a sine function curve and a tangent at an inflection point thereof, a combined curve $\Gamma_{L3}$ of an epicycloid function curve and a tangent at an inflection point thereof, a combined curve $\Gamma_{L4}$ of an odd power function, a combined curve $\Gamma_{L5}$ of a sine function, or a combined curve $\Gamma_{L6}$ of an epicycloid function, with a curve equation as follows:

When the continuous combined curve $\Gamma_L$ is the combined curve $\Gamma_{L2}$ of the sine function curve and the tangent at the inflection point thereof, the continuous combined curve $\Gamma_{L2}$ is formed by a sine function curve $\Gamma_{L22}$ and a tangent $\Gamma_{L21}$ at an inflection point of the sine function curve; a rectangular coordinate system is established at the tangent point of the continuous combined curve, and an equation of the combined curve $\Gamma_{L2}$ of the sine function curve and the tangent at the inflection point thereof is as follows:

$$\begin{cases} \Gamma_{L21}{:}x_{20} = t,\; y_{20} = kt \quad (t_1 \le t < 0) \\ \Gamma_{L22}{:}x_{20} = t,\; y_{20} = a\sin(bt) \quad (0 \le t \le t_2) \end{cases},$$

where a parameter/is an independent variable of the equation; $t_1$ and $t_2$ are value ranges of the continuous curve; a and b are coefficients of the equation; $x_{20}$ and $y_{20}$ are x-axis and y-axis coordinate values of the combined curve in the rectangular coordinate system, respectively; and k is a slope of the tangent at the inflection point of the sine function curve.

When the continuous combined curve $\Gamma_L$ is the combined curve $\Gamma_{L3}$ of the epicycloid function curve and the tangent at the inflection point thereof, the continuous combined curve $\Gamma_{L3}$ is formed by an epicycloid function curve $\Gamma_{L32}$ and a tangent $\Gamma_{L31}$ at an inflection point of the epicycloid function curve; a rectangular coordinate system is established at the tangent point of the continuous combined curve, and an equation of the combined curve $\Gamma_{L3}$ of the epicycloid function curve and the tangent at the inflection point thereof is as follows:

$$\begin{cases} \Gamma_{L31}{:} \\ \quad x_{30} = t \\ \quad y_{30} = kt \quad (t_1 \le t < 0) \\ \Gamma_{L32}{:} \\ \quad x_{30} = (R + r)\sin t - e\sin\big((R + r)t/r\big) \quad\quad (0 \le t < t_2) \\ \quad y_{30} = (R + r)\cos t - e\cos\big((R + r)t/r\big) - (R + r - e) \end{cases},$$

where a parameter t is an independent variable of the equation; $t_1$ and $t_2$ are value ranges of the continuous curve; a and b are coefficients of the equation; R and r are radii of a cycloidal moving circle and fixed circle, respectively; e is an eccentric distance; $x_{30}$ and $y_{30}$ are x-axis and y-axis coordinate values of the combined curve in the rectangular coordinate system, respectively; and k is a slope of the tangent at the inflection point of the epicycloid function curve.

When the continuous combined curve $\Gamma_L$ is the combined curve $\Gamma_{L4}$ of the odd power function, the continuous combined curve $\Gamma_{L4}$ is formed by a first odd power function curve $\Gamma_{L41}$ and a second odd power function curve $\Gamma_{L42}$; a rectangular coordinate system is established at the inflection point of the continuous combined curve, and an equation of the combined curve $\Gamma_{L4}$ of the odd power function is as follows:

$$\begin{cases} \Gamma_{L41}{:}x_{40} = t,\; y_{40} = at^{2n1-1} \quad (t_1 \le t < 0) \\ \Gamma_{L42}{:}x_{40} = t,\; y_{40} = bt^{2n2-1} \quad (0 \le t \le t_2) \end{cases},$$

where a parameter t is an independent variable of the equation; $t_1$ and $t_2$ are value ranges of the continuous curve; a and b are coefficients of the equation; n1 and n2 are degrees of the independent variable and are positive integers; and $x_{40}$ and $y_{40}$ are x-axis and y-axis coordinate values of the combined curve in the rectangular coordinate system, respectively.

When the continuous combined curve $\Gamma_L$ is the combined curve $\Gamma_{L5}$ of the sine function, the continuous combined curve $\Gamma_{L5}$ is formed by a first sine function curve $\Gamma_{L51}$ and a second sine function curve $\Gamma_{L52}$; a rectangular coordinate system is established at the inflection point of the continuous combined curve, and an equation of the combined curve $\Gamma_{L5}$ of the sine function is as follows:

$$\begin{cases} \Gamma_{L51}{:}x_{50} = t,\; y_{50} = a_1\sin(b_1 t) \quad (t_1 \le t < 0) \\ \Gamma_{L52}{:}x_{50} = t,\; y_{50} = a_2\sin(b_2 t) \quad (0 \le t \le t_2) \end{cases},$$

where a parameter t is an independent variable of the equation; $t_1$ and 2 are value ranges of the continuous curve; $a_1$, $b_1$, $a_2$ and $b_2$ are coefficients of the equation; and $x_{50}$ and $y_{50}$ are x-axis and y-axis coordinate values of the combined curve in the rectangular coordinate system, respectively.

When the continuous combined curve $\Gamma_L$ is the combined curve $\Gamma_{L6}$ of the epicycloid function, the continuous combined curve $\Gamma_{L6}$ is formed by a first epicycloid function curve $\Gamma_{L61}$ and a second epicycloid function curve $\Gamma_{L62}$; a rectangular coordinate system is established at the inflection point of the continuous combined curve, and an equation of the combined curve $\Gamma_{L6}$ of the epicycloid function is as follows:

$$\begin{cases} \Gamma_{L61}: \\ x_{60} = -(R_1 + r_1)\sin t + e\sin((R_1 + r_1)t/r_1) & (t_1 \le t < 0) \\ y_{60} = -(R_1 + r_1)\cos t + e\cos t((R_1 + r_1)t/r_1) + (R_1 + r_1 - e) \\ \Gamma_{L62}: \\ x_{60} = (R_2 + r_2)\sin t - e\sin((R_2 + r_2)t/r_2) & (0 \le t < t_2) \\ y_{60} = (R_2 + r_2)\cos t - e\cos((R_2 + r_2)t/r_2) - (R_2 + r_2 - e) \end{cases}$$

where a parameter t is an independent variable of the equation; $t_1$ and $t_2$ are value ranges of the continuous curve; $R_1$ and $r_1$ are radii of a first epicycloid moving circle and fixed circle, respectively, and $R_2$ and $r_2$ are radii of a second epicycloid moving circle and fixed circle, respectively; e is an eccentric distance; and $x_{60}$ and $y_{60}$ are x-axis and y-axis coordinate values of the combined curve in the rectangular coordinate system, respectively.

In the present disclosure, the inflection point or the tangent point of the continuous combined curve is as follows:

(1) When the continuous combined curve is a combined curve of an odd power function, a combined curve of a sine function or a combined curve of an epicycloid function, a connection point of the continuous combined curve is an inflection point, that is, a concave-convex boundary point of the curve, a second derivative of the curve is zero at this point, and second order derivative signs near two sides of this point are opposite;

(2) when the combined curve is a combined curve of an odd power function curve and a tangent at an inflection point thereof, a combined curve of a sine function curve and a tangent at an inflection point thereof, or a combined curve of an epicycloid and a tangent at an inflection point thereof, a connection point of the combined curve is an inflection point of the odd power function curve, the sine function curve or the epicycloid (meaning the same as (1)), which is also a tangent point of the odd power function curve, the sine function curve or the epicycloid at the tangent.

Figure 5:
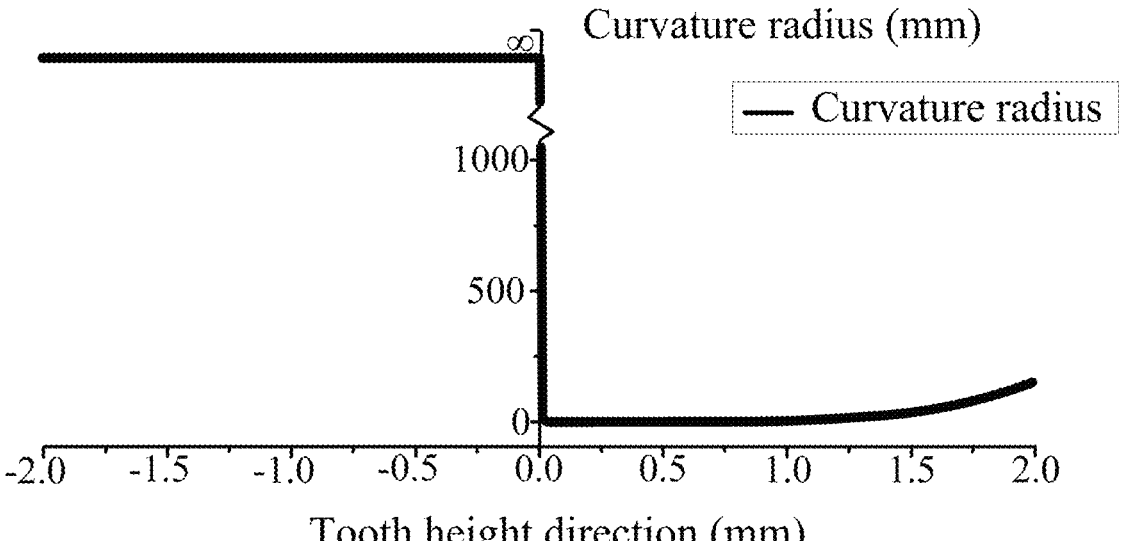
FIG. 5 is a schematic diagram illustrating a curvature radius at a meshing point of an internal meshing cylindrical gear pair with a constructed tooth pair having a combined curve of an odd power function curve and a tangent at an inflection point thereof as a tooth profile curve according to an embodiment of the present disclosure.

At the inflection point or the tangent point of the continuous combined curve, the curvature of the curve is zero, that is, the curvature radius tends to infinity. When the continuous combined curve is the combined curve of the odd power function, the combined curve of the sine function, or the combined curve of the epicycloid function, the curvature radii on two sides of the inflection point tend to infinity; or when the continuous combined curve is the combined curve of the odd power function curve and the tangent at the inflection point thereof, the combined curve of the sine function curve and the tangent at the inflection point thereof, or the combined curve of the epicycloid function curve and the tangent at the inflection point thereof, the curvature radius at the inflection point on the side of the odd power function curve, the sine function curve or the epicycloid function curve tends to infinity, and the curvature radius on the side of the tangent is infinite. The curvature radius of the combined curve is calculated based on given parameters in the embodiment, as shown in FIG. 5. The curvature radius of a straight line segment in the combined curve in FIG. 5 is infinite; the curvature radius at the inflection point tends to infinity, and the curvature radius of the cubic power function curve segment gradually decreases and then increases, but is still far less than the curvature radius at the inflection point. This means that the curvature radius at a contact point of the internal meshing cylindrical gear pair with a constructed tooth pair tends to infinity, which improves the bearing capacity of the internal meshing cylindrical gear pair with a constructed tooth pair.

Figure 6:
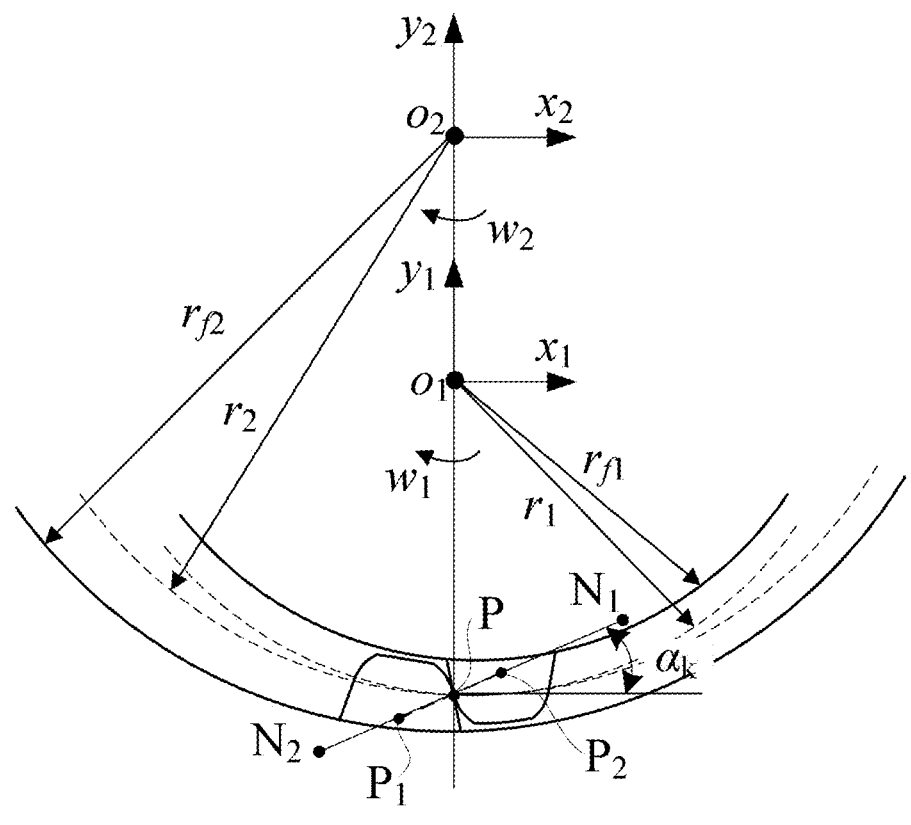
FIG. 6 is a schematic diagram of a designated point on a meshing force action line of an internal meshing cylindrical gear pair with a constructed tooth pair according to an embodiment of the present disclosure.

In the present disclosure, the inflection point or the tangent point of the continuous combined curve is a designated point located on a meshing force action line of the gear pair. The designated point is specifically defined as a given point at a pitch point or near the pitch point on the meshing force action line of the internal meshing cylindrical gear pair with a constructed tooth pair that is a straight line which forms a certain angle (pressure angle) with a horizontal axis by means of the pitch point. FIG. 6 is a schematic diagram of a designated point on a meshing force action line of a gear pair. In the figure, P is the designated point on the meshing force action line of the gear pair; $P_1$ and $P_2$ are limit points of the position range of the designated point; a straight line $N_1N_2$ is the meshing force action line of the gear pair; ax is a pressure angle; $O_1$-$x_1y_1$ and $O_1$-$x_2y_2$ are local rectangular coordinate systems of the external cylindrical gear 1 with a constructed tooth pair and the internal cylindrical gear 2 with a constructed tooth pair, respectively; $r_1$ and $r_2$ and $r_{f1}$ and $r_{f2}$ are pitch circle radii and dedendum circle radii of the external cylindrical gear 1 with a constructed tooth pair and the internal cylindrical gear 2 with a constructed tooth pair, respectively; and $w_1$ and $w_2$ are angular velocities of the external cylindrical gear 1 with a constructed tooth pair and the internal cylindrical gear 2 with a constructed tooth pair, respectively. The designated point P is a given point usually located at the pitch point or near either of two sides of the pitch point, and a variation area of the designated point does not exceed a half of a tooth height.

Figure 7:
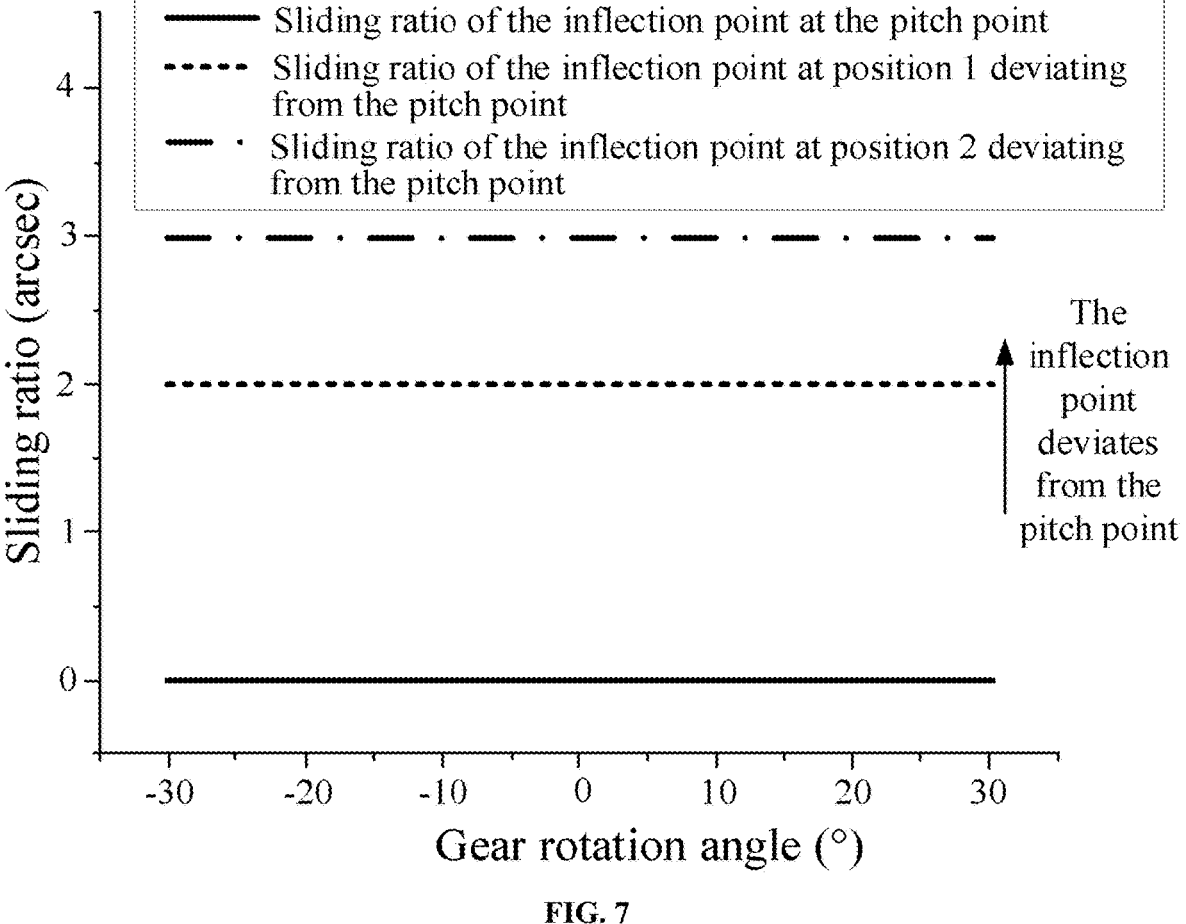
FIG. 7 is a schematic diagram illustrating a sliding ratio at a meshing point of an internal meshing cylindrical gear pair with a constructed tooth pair having a combined curve of an odd power function curve and a tangent at an inflection point thereof as a tooth profile curve according to an embodiment of the present disclosure.

According to the principle of gear meshing, it can be known that there is no relative sliding between tooth surfaces when the internal meshing cylindrical gear pair with a constructed tooth pair meshes at the pitch point. FIG. 7 is a schematic diagram illustrating a sliding ratio at a meshing point of an internal meshing cylindrical gear pair with a constructed tooth pair having a combined curve of an odd power function curve and a tangent at an inflection point thereof as a tooth profile curve according to an embodiment of the present disclosure. Since the internal meshing cylindrical gear pair with a constant meshing characteristics constructed tooth pair meshes at the pitch point at any time in the embodiment, the internal meshing cylindrical gear pair with a constructed tooth pair can achieve zero-sliding meshing. When the inflection point or the tangent point of the combined curve does not coincide with the pitch point, the sliding ratio of the internal meshing cylindrical gear pair with a constructed tooth pair is also constant but is not zero. A closer inflection point or tangent point of the continuous curve to the pitch point indicates a smaller sliding ratio of the internal meshing cylindrical gear pair with a constructed tooth pair, vice versa. When the inflection point or the tangent point coincides with the pitch point, the internal meshing cylindrical gear pair with a constructed tooth pair can achieve zero-sliding meshing transmission, which reduces the wear between tooth surfaces and improves the transmission efficiency of the internal meshing cylindrical gear pair with a constructed tooth pair.

Further, when the internal meshing cylindrical gear pair with a constant meshing characteristics constructed tooth pair that has the same tooth profile of the continuous combined curves has a contact ratio designed as an integer, the meshing stiffness of the internal meshing cylindrical gear pair with a constructed tooth pair is a constant, and at this time, a meshing force of the internal meshing cylindrical gear pair with a constructed tooth pair at any meshing position is determined. Therefore, when the contact ratio is designed as an integer, the internal meshing cylindrical gear pair with a constructed tooth pair having the same tooth profile of the continuous combined curves has a constant meshing state at any time, which effectively ensures stability of dynamic meshing performance of the internal meshing cylindrical gear pair with a constructed tooth pair and can effectively reduce vibration noise of the internal meshing cylindrical gear pair with a constructed tooth pair.

Specific examples are used herein to explain the principles and embodiments of the present disclosure. The foregoing description of the embodiments is merely intended to help understand the method of the present disclosure and its core ideas; besides, various modifications may be made by those of ordinary skill in the art to specific embodiments and the scope of application in accordance with the ideas of the present disclosure. In conclusion, the content of the description shall not be construed as limitations to the present disclosure.

What is claimed is:

1. An internal meshing cylindrical gear pair with a constant meshing characteristics constructed tooth pair, comprising an external cylindrical gear with a constructed tooth pair and an internal cylindrical gear with a constructed tooth pair as a pair based on conjugate curves, wherein a normal tooth profile curve $\Gamma_{s1}$ of the external cylindrical gear with a constructed tooth pair and a normal tooth profile curve $\Gamma_{s2}$ of the internal cylindrical gear with a constructed tooth pair are continuous combined curves $\Gamma_L$ with the same curve shape, and the continuous combined curves $\Gamma_L$ comprise a combined curve $\Gamma_{L1}$ of an odd power function curve and a tangent at an inflection point thereof; the continuous combined curve is formed by two continuous curves, a connection point of the two continuous curves is an inflection point or a tangent point of the continuous combined curve, and the inflection point or the tangent point of the continuous combined curve is a designated point located on a meshing force action line of the internal meshing cylindrical gear pair with a constructed tooth pair; and the normal tooth profile curves are swept along given conjugate curves to obtain tooth surfaces of the external cylindrical gear with a constructed tooth pair and the internal cylindrical gear with a constructed tooth pair;

wherein when the continuous combined curve $\Gamma_L$ is the combined curve $\Gamma_{L1}$ of the odd power function curve and the tangent at the inflection point thereof, the continuous combined curve $\Gamma_L$ is formed by an odd power function curve $\Gamma_{L12}$ and a tangent $\Gamma_{L11}$ at an inflection point of the odd power function curve; a rectangular coordinate system is established at the tangent point of the continuous combined curve, and an equation of the combined curve $\Gamma_{L1}$ of the odd power function curve and the tangent at the inflection point thereof is as follows:

$$\begin{cases} \Gamma_{L11}{:}x_{10} = t, \ y_{10} = 0 \ (t_1 \le t < 0) \\ \Gamma_{L12}{:}x_{10} = t, \ y_{10} = at^{2n-1} \ (0 \le t \le t_2) \end{cases},$$

wherein a parameter t is an independent variable of the equation; $t_1$ and $t_2$ are value ranges of the continuous curve; a is a coefficient of the equation; n is a degree of the independent variable and is a positive integer; and $x_{10}$ and $y_{10}$ are x-axis and y-axis coordinate values of the combined curve in the rectangular coordinate system, respectively.

2. The internal meshing cylindrical gear pair with a constant meshing characteristics constructed tooth pair according to claim 1, wherein a curve equation of the normal tooth profile curve $\Gamma_{s1}$ of the external cylindrical gear with a constructed tooth pair obtained by rotating the continuous combined curve $\Gamma_L$ around an origin of the rectangular coordinate system by an angle $\alpha_1$ is as follows:

$$\begin{cases} x_{01} = x_{n0} \cos\alpha_1 - y_{n0} \sin\alpha_1 \\ y_{01} = x_{n0} \sin\alpha_1 + y_{n0} \cos\alpha_1 \end{cases} (n = 1, 2, 3, 4, 5, 6),$$

wherein $x_{01}$ and $y_{01}$ are x-axis and y-axis coordinate values of the normal tooth profile curve of the external cylindrical gear with a constructed tooth pair in the rectangular coordinate system, respectively.

3. The internal meshing cylindrical gear pair with a constant meshing characteristics constructed tooth pair according to claim 2, wherein a curve equation of the normal tooth profile curve $\Gamma_{s2}$ of the internal cylindrical gear with a constructed tooth pair obtained by rotating the normal tooth profile curve $\Gamma_{s1}$ of the external cylindrical gear with a constructed tooth pair around the origin of the rectangular coordinate system by an angle of 180° is as follows:

$$\begin{cases} x_{02} = x_{01} \cos(180°) - y_{01} \sin(180°) \\ y_{02} = x_{01} \sin(180°) + y_{01} \cos(180°) \end{cases},$$

wherein $x_{02}$ and $y_{02}$ are x-axis and y-axis coordinate values of the normal tooth profile curve of the internal cylindrical gear with a constructed tooth pair in the rectangular coordinate system, respectively.

4. The internal meshing cylindrical gear pair with a constant meshing characteristics constructed tooth pair according to claim 2, wherein a tooth surface $\Sigma_1$ of the external cylindrical gear with a constructed tooth pair is obtained by sweeping the normal tooth profile curve $\Gamma_{s1}$ of the external cylindrical gear with a constructed tooth pair along a given helix, with a tooth surface equation as follows:

$$\begin{cases} x_{\Sigma 1} = x_{01} \cos\varphi_1 - y_{01}\cos\beta \sin\varphi_1 + r_{01}\cos\varphi_1 \\ y_{\Sigma 1} = x_{01}\sin\varphi_1 + y_{01}\cos\beta \cos\varphi_1 + r_{01}\sin\varphi_1 \\ z_{\Sigma 1} = r_{01} \varphi_1 \cot\beta - y_{01} \sin\beta \end{cases},$$

wherein $x_{\Sigma 1}$, $y_{\Sigma 1}$ and $z_{\Sigma 1}$ are coordinate values of the tooth surface of the external cylindrical gear with a constructed tooth pair, respectively; $\beta$ is a helix angle of the gear pair; $\varphi_1$ is an angle of a given contact line; and $r_{01}$ is a pitch radius of the external cylindrical gear with a constructed tooth pair.

5. The internal meshing cylindrical gear pair with a constant meshing characteristics constructed tooth pair according to claim 3, wherein a tooth surface $\Sigma_2$ of the internal cylindrical gear with a constructed tooth pair is obtained by sweeping the normal tooth profile curve $\Gamma_{s2}$ of the internal cylindrical gear with a constructed tooth pair along a given helix, with a tooth surface equation as follows:

$$\begin{cases} x_{\Sigma 2} = x_{02} \cos \varphi_1 - x_{02} \cos \beta \sin \varphi_1 + r_{02} \cos \varphi_1 \\ y_{\Sigma 2} = x_{02} \sin \varphi_1 + y_{02} \cos \beta \cos \varphi_1 + r_{02} \sin \varphi_1 \ , \\ z_{\Sigma 2} = r_{02}\varphi_1 \cot \beta - y_{02} \sin \beta \end{cases}$$

wherein $x_{\Sigma 2}$, $y_{\Sigma 2}$ and $z_{\Sigma 2}$ are coordinate values of the tooth surface of the internal cylindrical gear with a constructed tooth pair, respectively, and $r_{02}$ is a pitch radius of the internal cylindrical gear with a constructed tooth pair.

6. The internal meshing cylindrical gear pair with a constant meshing characteristics constructed tooth pair according to claim 1, wherein a contact ratio of the internal meshing cylindrical gear pair with a constructed tooth pair is designed as an integer to achieve transmission at a constant meshing stiffness.

\* \* \* \* \*